(12) United States Patent
Tirone

(10) Patent No.: US 8,967,212 B2
(45) Date of Patent: Mar. 3, 2015

(54) TIRE WITH TREAD INCLUDING BLOCKS AND SIPES

(75) Inventor: Antonio Tirone, Rome (IT)

(73) Assignee: Bridgestone Corporation, Tokyo (JP)

( * ) Notice: Subject to any disclaimer, the term of this patent is extended or adjusted under 35 U.S.C. 154(b) by 1574 days.

(21) Appl. No.: 12/224,223

(22) PCT Filed: Feb. 26, 2007

(86) PCT No.: PCT/EP2007/051815

§ 371 (c)(1),
(2), (4) Date: Jan. 26, 2009

(87) PCT Pub. No.: WO2007/099084

PCT Pub. Date: Sep. 7, 2007

(65) Prior Publication Data

US 2009/0301620 A1    Dec. 10, 2009

(30) Foreign Application Priority Data

Feb. 28, 2006   (IT) .............................. TO2006A0143

(51) Int. Cl.
  *B60C 11/12* (2006.01)
  *B60C 11/03* (2006.01)

(52) U.S. Cl.
  CPC ......... *B60C 11/12* (2013.01); *B60C 2011/1213* (2013.01); *B60C 11/0306* (2013.01); *B60C 11/1218* (2013.01); *Y10S 152/03* (2013.01)
  USPC ............. 152/209.21; 152/209.23; 152/DIG. 3

(58) Field of Classification Search
  CPC  B60C 11/0306; B60C 11/12; B60C 11/1218; B60C 2011/1213

USPC ........................... 152/209.21, 209.23, DIG. 3
See application file for complete search history.

(56) References Cited

U.S. PATENT DOCUMENTS

| 5,350,001 A  * |  9/1994 | Beckmann et al. ...... 152/DIG. 3 |
| 6,408,911 B1   |  6/2002 | Tanabe et al. |
| 6,786,257 B1   |  9/2004 | Koide |
| 7,143,799 B2 * | 12/2006 | Collette et al. ........... 152/DIG. 3 |
| 2002/0053383 A1* |  5/2002 | Kleinhoff et al. ........ 152/209.23 |
| 2005/0109438 A1 |  5/2005 | Collette et al. |

(Continued)

FOREIGN PATENT DOCUMENTS

| DE | 19543940     | * | 5/1997 |
| EP | 0 747 242 A1 |   | 12/1996 |
| EP | 0 881 103 A1 |   | 12/1998 |

(Continued)

OTHER PUBLICATIONS

Machine translation for Japan 2003-182314 (no date).*

(Continued)

*Primary Examiner* — Steven D Maki
(74) *Attorney, Agent, or Firm* — Oliff PLC

(57) ABSTRACT

A tire, wherein the tread has a number of raised blocks divided into a number of elements by sipes crosswise to a motion direction of the tire. Each element has at least a first lateral surface separated by a sipe from a second lateral surface of an adjacent element and having at least one first portion sloping with respect to the motion direction and facing a second portion of the second surface. Parting of the first and second portion in the motion direction is controlled by an elastic locking device for locking the two portions to each other.

6 Claims, 2 Drawing Sheets

(56) References Cited

U.S. PATENT DOCUMENTS

2006/0169377 A1* 8/2006 Hashimoto et al. .. 152/DIG. 003
2007/0187014 A1* 8/2007 Metzger ............... 152/DIG. 003

FOREIGN PATENT DOCUMENTS

| EP | 0 933 235 A2 | | 8/1999 |
| --- | --- | --- | --- |
| EP | 1 072 445 A1 | | 1/2001 |
| EP | 1195271 | * | 4/2002 |
| EP | 1 533 141 A1 | | 5/2005 |
| JP | A-11-001106 | | 1/1999 |
| JP | 11-189014 | * | 7/1999 |
| JP | 2973026 | * | 11/1999 |
| JP | 2000-025419 | * | 1/2000 |
| JP | 2003-182314 | * | 7/2003 |
| JP | A-2005-041393 | | 2/2005 |
| JP | 2005-297758 | * | 10/2005 |
| WO | WO 99/48707 A1 | | 9/1999 |
| WO | WO-2005/030502 A1 | * | 4/2005 |

OTHER PUBLICATIONS

Machine translation for Japan 2000-025419 (no date).*
Machine translation for Japan 2973026 (no date).*
Machine translation for Japan 11-189014 (no date).*
Machine translation for Germany 19543940 (no date).*
Machine translation for Europe 1,195,271 (no date).*
Machine translation for Japan 2005-297758 (no date).*

* cited by examiner

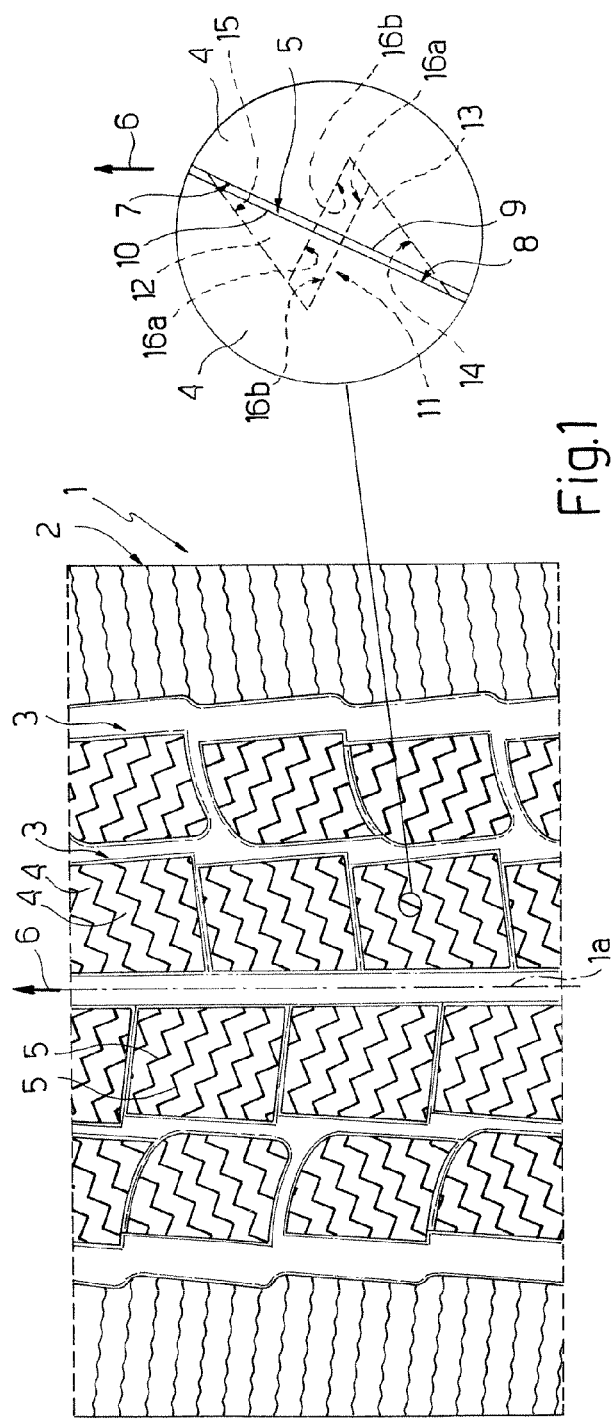
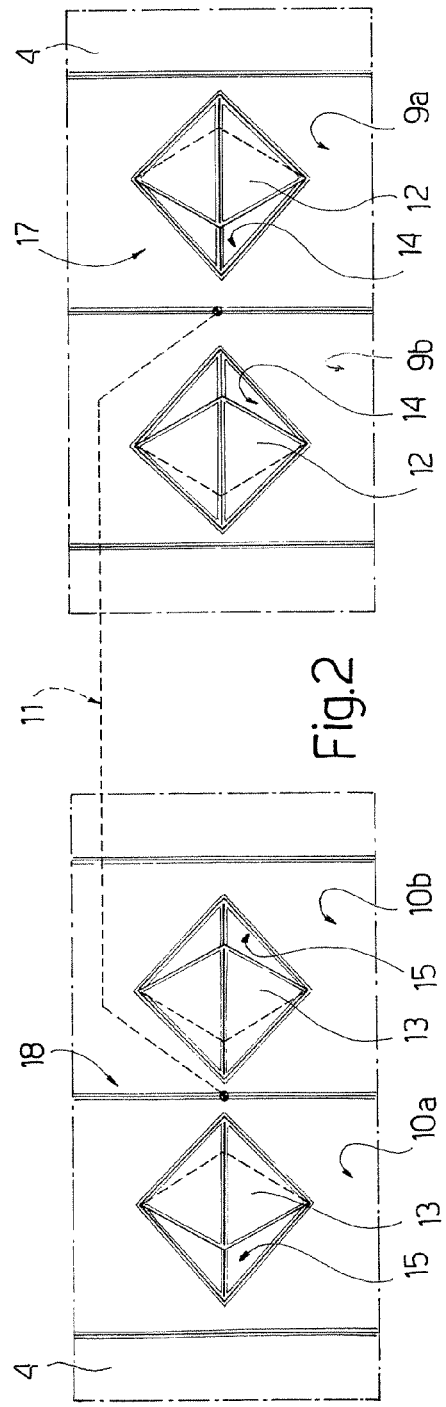
Fig.1
Fig.2

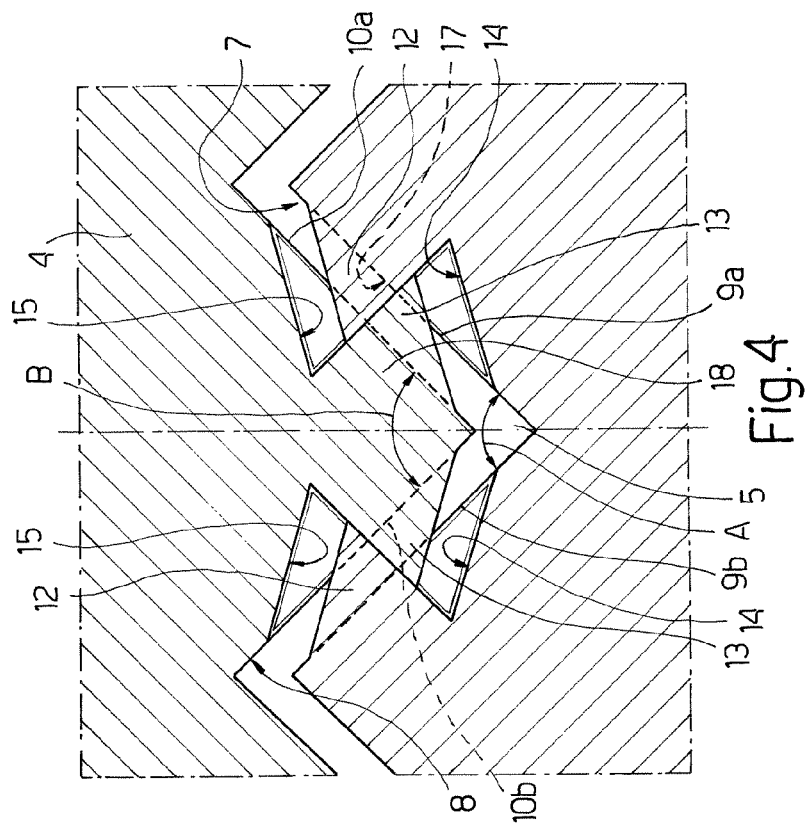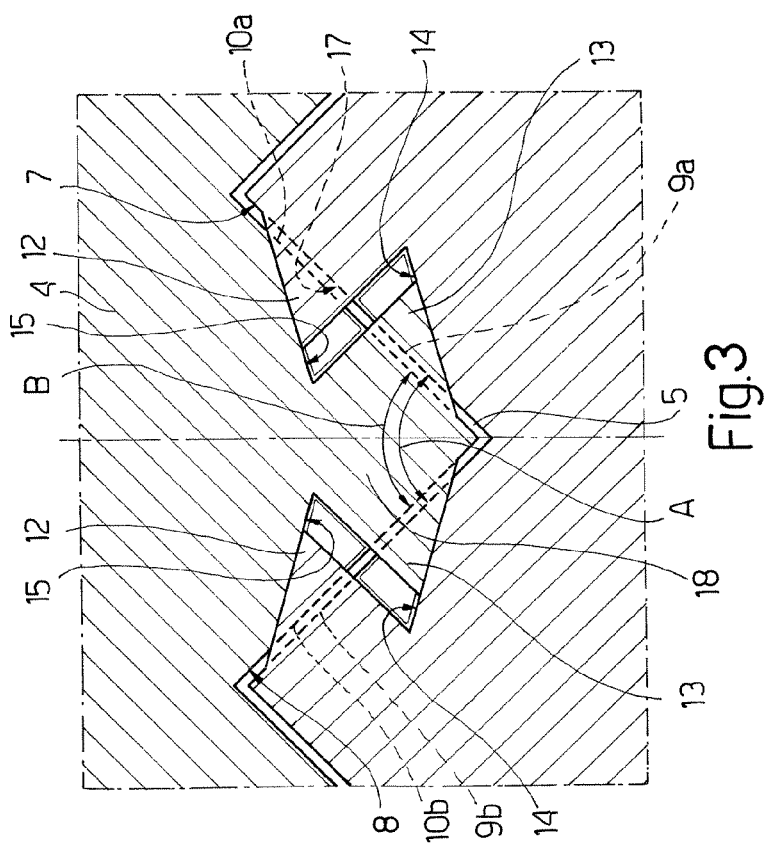

TIRE WITH TREAD INCLUDING BLOCKS AND SIPES

TECHNICAL FIELD

The present invention relates to a tire.

BACKGROUND ART

Tires are known in which the tread has circumferential and transverse grooves defining a number of blocks, at least some of which have, on the outer surface, a number of sipes substantially crosswise to the motion direction of the tire. The sipes, which divide the relative blocks into respective numbers of relatively flexible elements crosswise to the motion direction of the tire, serve not only to break up the film of water on wet road surfaces, for better tire-ground contact in the rain, but also, and above all, to trap snow, by flexing, between adjacent elements to improve traction, braking, and lateral stability on snow.

While improving grip of the tire on wet road surfaces or snow, siped blocks, on the other hand, obviously have the drawback—given the flexibility of the relative elements, and especially on dry road surfaces—of impairing tire performance in terms of handling capacity, traction, and braking.

To control deformation of the elements with respect to the adjacent elements when subjected to lateral forces, EP-1 073 562 proposes increasing friction between two surfaces of adjacent elements separated by a sipe, by imparting mating three-dimensional shapes to the surfaces. More specifically, projections are formed on each of the two surfaces, and each engage a respective cavity on the other surface.

Such a solution allows control of transverse deformation of the elements, i.e. along the relative sipes, but not of longitudinal deformation of the elements, i.e. crosswise to the relative sipes.

DISCLOSURE OF INVENTION

It is an object of the present invention to provide a tire designed to minimize the aforementioned drawback, while still maintaining the same wet and/or snow traction characteristics.

According to the present invention, there is provided a tire as claimed in the attached independent Claim and, preferably, depending directly or indirectly on the independent Claim.

BRIEF DESCRIPTION OF THE DRAWINGS

A non-limiting embodiment of the present invention will be described by way of example with reference to the accompanying drawings, in which:

FIG. 1 shows a plan view of a tread portion of a preferred embodiment of the tire according to the present invention;

FIG. 2 shows a larger-scale, schematic exploded view of a preferred embodiment of a detail in FIG. 1;

FIGS. 3 and 4 show sections of the FIG. 2 detail in a non-deformed and deformed configuration respectively.

BEST MODE FOR CARRYING OUT THE INVENTION

Number 1 in FIG. 1 indicates as a whole a tire with a tread 2 having a number of raised blocks 3 divided into a number of elements 4 by sipes 5 oriented in a direction substantially crosswise to a motion direction 6 of tire 1.

In connection with the above, it should be stressed that the term "motion direction" is intended to mean the instantaneous displacement direction of the tire, and not the travelling direction of the relative vehicle. Motion direction 6, therefore, though shown parallel to an equatorial plane of tire 1 by way of example, may be variously oriented differently from the one shown.

Each element 4 has at least one lateral surface 7, which extends along a sipe 5, faces a lateral surface 8 of an adjacent element 4, and includes at least one portion 9 sloping with respect to motion direction 6 and mating with a corresponding portion 10 of lateral surface 8. Given the slope of portions 9 and 10, one of them (portion 9 in the example shown) faces an equatorial plane 1a of tire 1, while the other faces outwards of tire 1.

Portions 9 and 10 are connected, in motion direction 6, by an elastic locking device indicated as a whole by 11 and includes an elastic appendix 12 projecting from portion 9 towards portion 10, and an elastic appendix 13 projecting from portion 10 towards portion 9. Appendixes 12 and 13 lock on mutually, when portions 9 and 10 part in motion direction 6. For which purpose, the appendix 12, 13 projecting from the portion 9, 10 facing equatorial plane 1a (appendix 12 in the example shown) is located outwards of the other appendix 13, 12 with respect to equatorial plane 1a.

Elastic locking device 11 also includes a cavity 14 associated with appendix 12 and formed through portion 9 to receive appendix 13; and a cavity 15 associated with appendix 13 and formed through portion 10 to receive appendix 12. Each appendix 12, 13 is substantially in the form of a convex pyramid; each cavity 14, 15 is in the form of a concave pyramid; and each of appendixes 12 and 13 and the associated cavity 14, 15 have respective coplanar, contiguous faces 16a and 16b, which are perpendicular to relative portion 9, 10, substantially radial with respect to tire 1, and mate with corresponding faces 16b, 16a of the other appendix 13, 12 and the other cavity 15, 14.

In actual use, parting of portions 9 and 10 in motion direction 6 gradually compresses the pairs of faces 16a and 16b against each other to limit expansion of relative sipe 5 in motion direction 6 in controlled manner.

In the FIG. 2-4 embodiment, lateral surface 7 includes at least two portions 9a and 9b forming a concave angle A and mating with respective portions 10a and 10b forming a convex angle B equal to concave angle A.

In an embodiment not shown, the two portions 9a and 9b, and likewise the two portions 10a and 10b, may be separated by a further portion of lateral surface 7 and 8 respectively. In the example shown, however, portions 9a and 9b are consecutive and adjacent, and define a concave dihedron 17 with a flare angle equal to concave angle A; portions 10a and 10b are consecutive and adjacent, and define a convex dihedron 18 with a flare angle equal to convex angle B; and elastic appendixes 12 are located between elastic appendixes 13.

The invention claimed is:
1. A tire having a tread, the tire comprising:
 a plurality of raised blocks, the plurality of raised blocks being divided into a plurality of elements by sipes crosswise to a motion direction of the tire, each of the plurality of elements comprising:
  at least a first lateral surface extending along at least one of the sipes, the first lateral surface facing a second lateral surface of an adjacent element, and the first lateral surface including at least one first portion facing and mating with a corresponding at least one second portion of the second lateral surface;

an elastic locking device with a three-dimensional configuration for locking the at least one first portion and the at least one second portion to each other in the motion direction, thereby limiting relative movement of the at least one first portion and the at least one second portion along a motion direction, the elastic locking device being provided in one given location below an upper surface of the block; the elastic locking device comprising:
a first elastic appendix projecting from the at least one first portion towards the at least one second portion;
a second elastic appendix projecting from the at least one second portion towards the at least one first portion; and
a first cavity and a second cavity associated with the first appendix and the second appendix, respectively, and formed in the at least one first portion and the at least one second portion, respectively, to receive the second appendix and the first appendix, respectively; wherein
each of the first lateral surface and the second lateral surface has a two-dimensional configuration completely surrounding the elastic locking device;
each of the first appendix and the second appendix is in a form of a convex pyramid, and each of the first cavity and the second cavity is in a form of a concave pyramid;
in a non-deformed condition of the elements, the first appendix and the second appendix are separated by a gap, and when the first appendix and the second appendix part in the motion direction, the sipe expands and the gap decreases, and then the first appendix and the second appendix lock on mutually.

2. The tire as claimed in claim 1, the tire having an equatorial plane, wherein
the at least one first portion and the at least one second portion slope with respect to the motion direction;
one of the at least one first portion and the at least one second portion faces the equatorial plane, and the other of the at least one first portion and the at least one second portion faces outwards; and
the appendix of one of the at least one first portion and the at least one second portion projects from the portion facing the equatorial plane and is located outwards of the appendix of the other one of the at least one first portion and the at least one second portion with respect to the equatorial plane.

3. The tire as claimed in claim 1, wherein the first appendix and the first cavity have coplanar, contiguous faces, which are perpendicular to the at least one first portion and are substantially radial with respect to the tire, the second appendix and the second cavity have coplanar, contiguous faces, which are perpendicular to the at least one second portion and are substantially radial with respect to the tire, and the coplanar, contiguous faces of the first appendix and the first cavity mate with the coplanar, contiguous faces of the second appendix and second cavity.

4. The tire as claimed in claim 1, wherein the first lateral surface includes at least two first portions forming a concave angle that mate with respective at least two second portions of the second lateral surface, the second portions forming a convex angle equal to the concave angle.

5. The tire as claimed in claim 4, wherein the at least two first portions are consecutive and define a concave dihedron with a flare angle equal to said concave angle; and the at least two second portions are consecutive and define a convex dihedron with a flare angle equal to the convex angle.

6. The tire as claimed in claim 1, wherein the elastic locking device includes two first appendixes and two second appendixes located between the two first appendixes.

* * * * *